United States Patent [19]
Flaat

[11] Patent Number: 6,101,325
[45] Date of Patent: *Aug. 8, 2000

[54] PARAMETERIZED PACKAGING SYSTEM FOR PROGRAMMING LANGUAGES

[75] Inventor: Christopher A. Flaat, Bellevue, Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/728,891

[22] Filed: Oct. 10, 1996

[51] Int. Cl.[7] .................................................. G06F 9/45
[52] U.S. Cl. .......................... 395/705; 395/701; 395/709
[58] Field of Search ..................................... 395/701, 708, 395/702, 703, 704, 705, 706, 707, 709

[56] References Cited

U.S. PATENT DOCUMENTS 5,428,792  6/1995  Conner et al. ........................... 395/708

OTHER PUBLICATIONS

Bajarne Stroustrup, The Design and Evolution of C++, AT&T Bell Laboratories, Murray Hill, NJ, 1994, Chapter 18, pp. 423–426.

Ribeiro–Filho—Treleaven, G A M E: A Framework for Programming Genetic Algorithms Applications, IEEE, Apr., 1994.

Johnson, Colin R., Internet Software Development Tools Arrive, Electronic Engineering Times, Aug., 1995.

*Primary Examiner*—James P. Trammell
*Assistant Examiner*—Antony Nguyen-Ba
*Attorney, Agent, or Firm*—Christensen O'Connor Johnson & Kindness PLLC

[57] ABSTRACT

A parameterized packaging system is provided for programming languages utilizing a preprocessor. A client of a package or facility may choose from among multiple interfaces for the package. Selection of a particular interface is made by passing interface parameters to the package in the package usage declarations. The proper package/interface file containing the definition of the requested interface is returned to the client in response to reading the interface parameters. Each interface of the available group of interfaces for a package is a fixed interface available for querying by a user of the package. Preprocessing is used in the creation of the interfaces as long as the preprocessor macros are only visible to the underlying package implementation and not the package interface. The developer is provided with the flexibility in design possible with the preprocessor as well as fixed and predictable package interfaces.

42 Claims, 9 Drawing Sheets

PARAMETERIZED PACKAGING SYSTEM FOR PROGRAMMING LANGUAGES

FIELD OF THE INVENTION

The invention relates to the field of programming languages and in particular to the field of programming languages utilizing preprocessing to flexibly create programming module or package interfaces.

PROBLEM

Different computer languages employ different solutions to the problem of providing a powerful and flexible yet simple and efficient programming environment. Each computer language ultimately represents a tradeoff of design parameters. Those parameters include, but are not limited to, implementation and maintenance expense, quality standards, short development period, and portability. One characteristic of a computer language that is important to many of these parameters is the degree of modularity possible in the structuring of a program. Modern software projects are large, multi-person, even multi-corporation efforts. A common way to accomplish these projects is to break them down into smaller tasks that small groups of people can work on and ultimately to small enough tasks suitable for individual efforts. It is critical to the cost and time of development that these numerous component pieces be amenable to construction of the larger whole with a minimum of conflict of the parameters and operation of the various pieces.

Each block or module of code, whether it is uniquely developed for a certain program or it is preexisting as a vendor-supplied block and is utilized or referenced by a program, must have a known interface. A code module's interface defines the way in which other modules send data to and receive data from the module. Current preprocessed languages, of which C and C++ are the best examples, provide a great deal of flexibility to users in the definition of customized interfaces. To utilize a preexisting module of code, a user simply needs to include in his or her program a reference to the header file for the pre-existing code module and specify certain characteristics for that module. At compile time, the header files are compiled according to the characteristics specified by the developer and the required interface between the developer's program and the pre-existing module of code is defined. For example, a Windows application includes the Windows header file and the developer might specify, among other characteristics, that he or she wants the Unicode versions of the Windows interface. When compiled, the Unicode versions of the Windows interface are included in the application. The compilation of the header files to build the interfaces, however, is quite expensive as there are often multiple layers of nested headers resulting in enormous compilation units. Also, any change made to the compilation unit requires another expensive preprocessing phase. A further problem is that the preprocessor can cause hard-to-understand interference when different headers provide different definitions for the same interface.

One approach to circumventing the lengthy compilation problem of large header files is the use of precompiled headers. If several source files all rely on the same set of headers, the compiler state is saved at the point when all the common headers have been processed. The common header code is thereby "factored out". When the compilation process is later restarted for each source file, time is saved by retrieving the saved compilation state and restarting the compilation at the saved state.

There are shortcomings with the use of precompiled headers. One is the requirement of a large amount of disk space and memory for storage of the compilation state. Another is that a change to the stored compilation state is not possible. The slightest change to any of the source files requires a complete recompilation of the stored state which is, as described before, an expensive operation in terms of processing time. A change to a source file could be necessary for any number of reasons including the updating of information due to debugging or optimization changes.

Non-preprocessed languages such as Ada or the Modula family of languages utilize a different approach to the modularization of software. Whereas in C++ a facility such as Windows is included in an application through the inclusion of the Windows header file, in the Ada-like languages each facility is contained in a stand-alone package having a fixed interface. The fixed interfaces are presented in a compact form that has already undergone some processing and is quicker to compile than would be the raw source code. The fixed interfaces of these languages, although more efficient to compile, remove a great deal of the flexibility from the developer in the design of an application.

The Ada approach of fixed interfaces is not directly transportable to C++ because the C++ header files are themselves significantly preprocessed to cope with the various related but different expressions of the same conceptual interface. For example, a Windows NT program can be built to use Unicode or ANSI character sets depending on what preprocessor symbols are defined before the Windows headers are compiled. The interface presented by the Windows API header files is very different depending on how the Windows headers are preprocessed.

There exists a need for a programming environment which provides a powerful and flexible preprocessor and which provides an efficient and effective modularization of code with predictable interface definitions.

SOLUTION

The above-described problems and others are solved and an advance in the art is thereby achieved by the parameterized packaging system of the present invention. The present invention provides methods for the construction of code packages with a set of fixed interfaces, any one of which is selectable by a client of the package at compile time. A particular package interface is selected by specifying parameters into the package. This identifies a particular interface from among a family of available fixed interfaces. Preprocessor macros can still be exposed so long as they are only visible to a client package's underlying implementation and not the client package's interface. The present invention effectively marries the powerful preprocessing capabilities of languages like C and C++ with the fixed, predictable and efficient package interfaces of Ada-like languages.

The interfaces for a particular package are constructed or preprocessed at a time prior to the compilation of an application. A set of interface elements are exposed by specifying parameters into the package. This allows one to specify different interfaces for a given package without having to employ a full preprocessor. This is advantageous, for example, where a package needs to be flexible enough to support an application which must exist in several different variations, all of which must be built from the same source code. Preprocessor macros and symbol transformations are exposed as in C/C++ with the caveat that they are only visible to other packages' underlying implementations, not their package interfaces. This forces the interfaces for these packages to remain fixed and predictable but still allows the client the needed flexibility for C/C++ development where code must be preprocessed before it is usable.

A set of package interfaces is created by first defining the package parameters that are appropriate for the package. The parameters include a parameter name and the possible variations of the parameter. At least one package interface will exist for each parameter variation. When the package is created or preprocessed the parameter definitions are read and each line of code is parsed looking for the interface declarations. A package file for each respective interface is built as the lines of the interface declaration are parsed. Each package file is effectively a symbol table defining the interface elements for a particular interface variation with respect to a particular package.

A package is used by appropriately defining the package usage declarations. A package usage declaration specifies the package or facility, e.g. Windows API, and it specifies the parameters used to select a particular version of the package or facility. The package parameters are read and the requested package is retrieved according to the specified parameters. The symbols of the retrieved package file are added to the base symbol table. The interface symbols will be recognized when they are thereafter encountered.

The package files may all be built at once thereby making them available for use and for querying, as described below. Alternatively the package files may be built only as their use is requested if a user has the package sources available to them. This "on demand" building of the package files is especially likely to be useful during the development and debugging of a complex package with numerous potential interface variations.

A further advantage of the parameterized packaging system of the present invention is that a client can query constructed packages to receive a complete listing of the symbols and macros available in a given package. There is no need to compile in order to learn the full extent of a package's interface as all the information is stored and available for in the package file.

Figure 1:
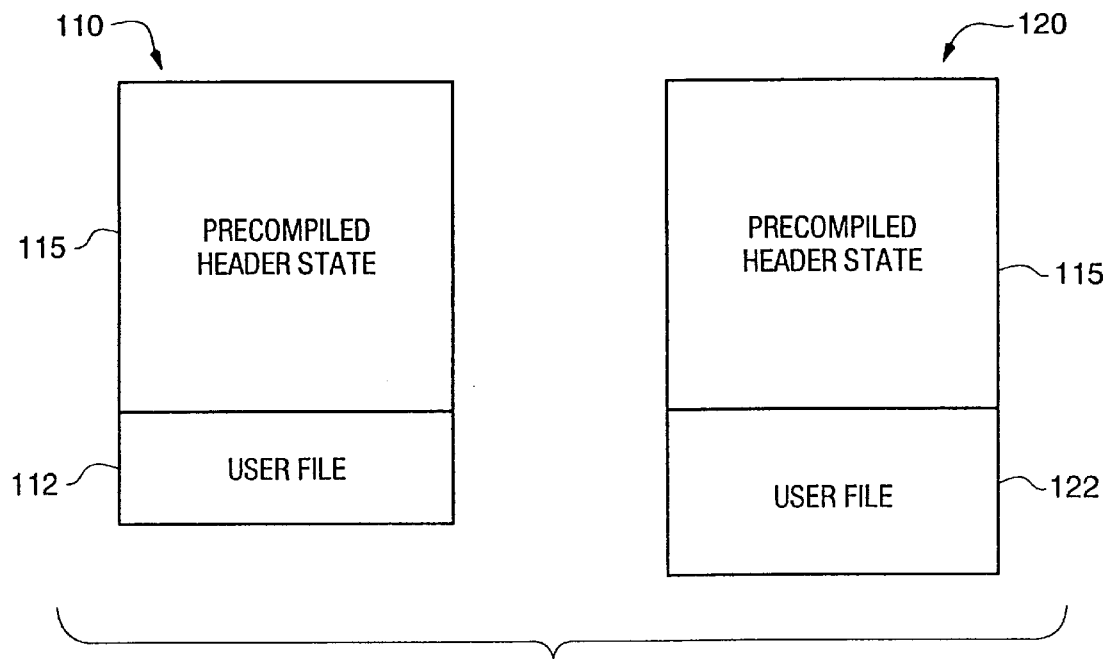
FIG. 1 illustrates in schematic form the use in the Prior Art of precompiled headers.

DETAILED DESCRIPTION
Pre-compiled Headers (Prior Art)—FIG. 1

FIG. 1 is a schematic representation of the use of precompiled headers in some preprocessed languages such as C/C++. User file 112 and user file 122 represent different modules of code each dependent on the same set of referenced code modules. As an example of the use of precompiled headers, consider that user files 112 and 122 are C++ modules which utilize the Microsoft Foundation Classes (MFC). Each of user files 112 and 122 must include, via the "#include" mechanism of C++, the header file for MFC. The MFC header file in turn contains the header files for the standard C++ run-time library and the Windows Applications Programming Interface (API). The result is a header file for user file 112 and user file 122 that is quite large and adds a great deal of time to the compilation process. Since both user files 112 and 122 reference the same facilities to be included via preprocessing of the header files, the common header code can be factored out. The compiler state is saved at the point at which the header files common to user files 112 and 122 has been processed. This precompiled header state 115 is retrieved when the compilation process is restarted for each of files 112 and 122. File 110 is thus comprised of user file 112 and precompiled header state 115 and file 120 is comprised of user file 122 and precompiled header state 115. It is apparent to those skilled in the art that the size of user files 112 and 122 compared to the size of precompiled header state 115 as represented schematically in FIG. 1 is not to scale. It is common for a module's header file to be a hundred times or more larger than the module itself. This approach of the prior art speeds the usage of large header files by creating the precompiled header. Creation of the precompiled header is itself a slow step and the resulting precompiled state requires an enormous amount of space to store.

The preprocessing capabilities of programming languages such as C/C++ provide the developer a tremendous degree of flexibility in designing customized interfaces for modules of code. However, preprocessing, as described above, often necessitates large header files which in turn are expensive to compile. Precompiled headers are one approach to solving this problem. A limitation, however, with the approach of precompiled headers is that any change in the compiler configuration requires the re-creation of precompiled header state 115. This is necessary because pre-compiled header state 115 cannot be changed or edited once it is created.

Figure 2:
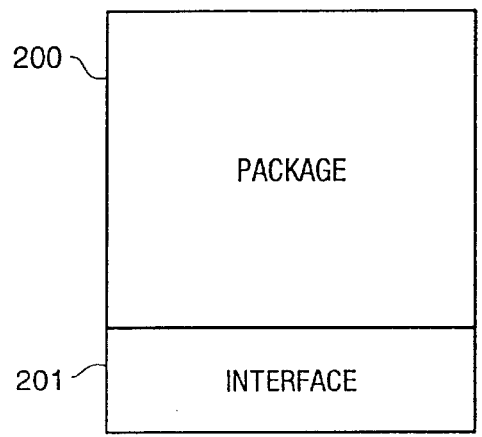
FIG. 2 illustrates in schematic form a programming package having a fixed interface.

Separate Packages with Fixed Interfaces (Prior Art)—FIG. 2

Ada, Modula and other non-preprocessed languages do not have header files to compile and therefore the approach of precompiled headers, described with respect to FIG. 1, is not relevant to these languages. Unfortunately, the non-preprocessed languages also do not have the flexibility of interface design that is characteristic of the preprocessed languages. In the C++ example of FIG. 1, the code modules on which the user code depended were included through the preprocessing of the header files for each of the related modules. In the Ada-like languages, each of the different facilities, e.g. MFC or Windows API, is accessed through a fixed interface of a stand-alone package. Each package implements a particular function or facility and provides a fixed interface for interaction with other packages.

FIG. 2 is a schematic representation of an Ada package. Package 200 having interface 201 implements, for example, the Windows API. The functions of package 200 are accessed and utilized through interface 201 which can not be modified by the client of package 200. Interface 201 is presented to its clients in a compact form that has already undergone some processing and is quicker to compile than would be the raw source code. To access the implementation of package 200, one would include in its application, in psuedocode, some form of "USE Package 200". If the client wants a different interface then a different package must be selected.

Figure 3:
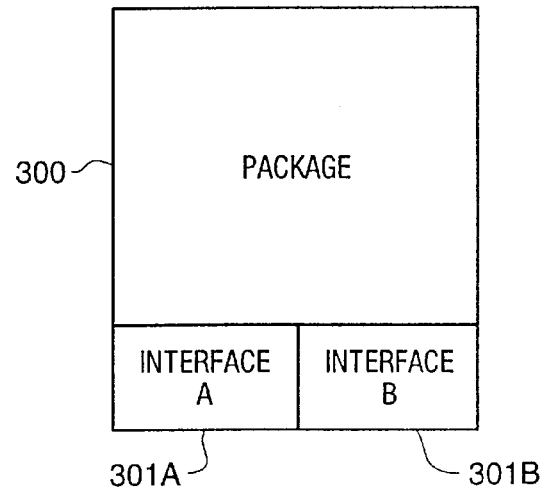
FIG. 3 illustrates in schematic form a programming package having selectable interfaces according to the present invention.

Parameterized Packages In General—FIG. 3

FIG. 3 is a schematic representation of the general parameterized packaging system of the present invention. Package 300 represents a module of code implementing the same functionality as package 200 of FIG. 2. A client who wants to add the functionality of package 300 to its client-developed code or application must identify package 300 so that the system knows to include package 300 at compile time. The advantage of package 300 is that the interface of package 300, which is actually used, can be selected from between interface 301A and interface 301B. A parameter, "A" or "B" in this example, is passed along with the package name when selecting the package. For example, the client would include psuedocode in the form "USE Package 300 (B)" in order to select interface 301B of package 300. In this way the desired one of interfaces 301A and 301B can be selected by the client. This one-dimensional example of selecting between interface "A" or interface "B" is provided for the sake of simplicity. The present invention, as described below, also provides for interface possibilities for a given package that are selected using multiple and inter-related parameters. In the example of C/C++ above, the selection of a different interface would require the complete recompilation of the package definition. In the example of the Ada-like languages, there is only one interface available and the selection of a different interface requires the selection and possibly the creation of a different package.

Figure 4:
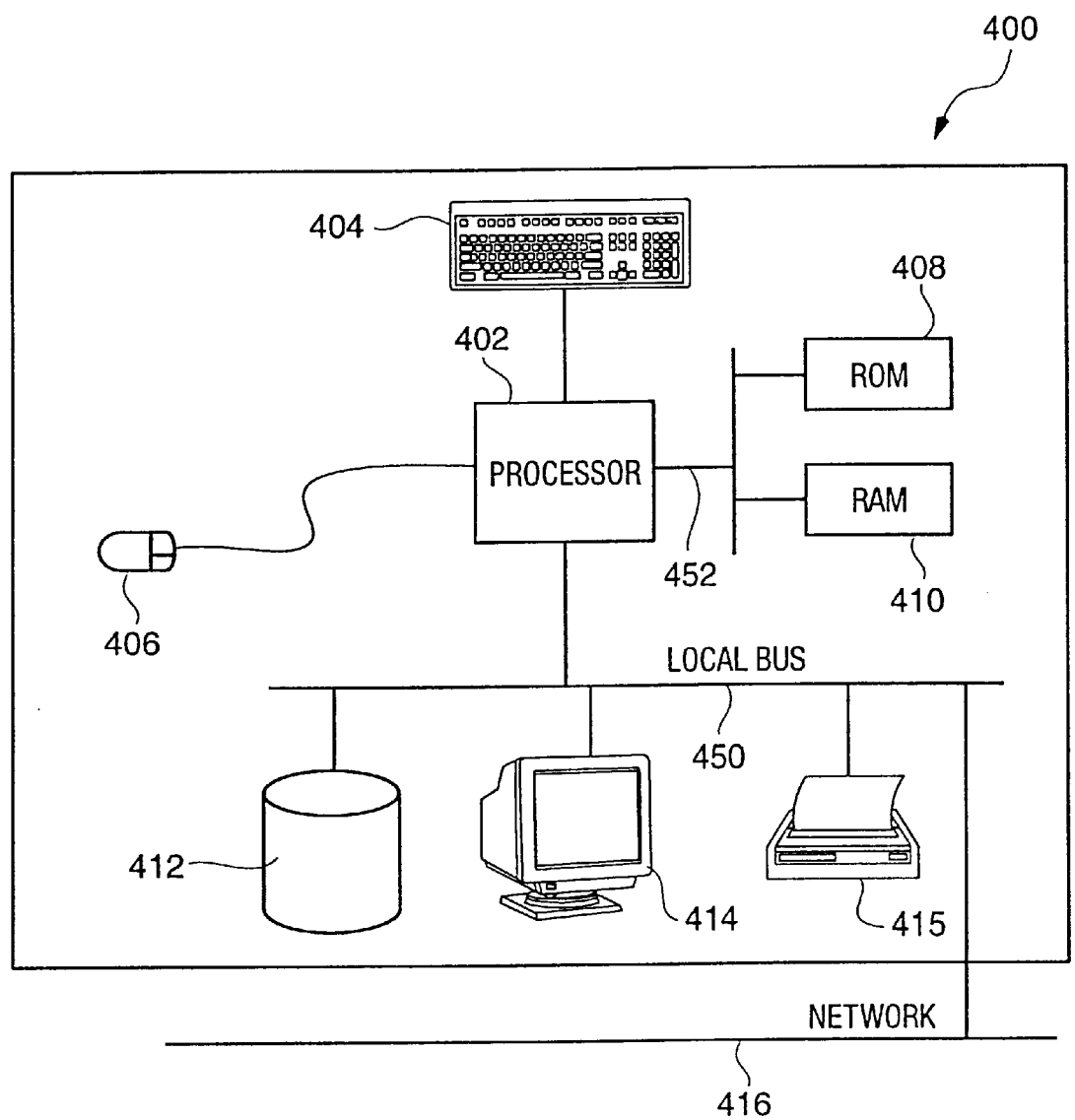
FIG. 4 depicts a general computing environment within which the present invention is implemented.

General Computing Environment—FIG. 4

FIG. 4 illustrates a block diagram of a computer system 400. The parameterized packaging system of the present invention is operable in any of several standard computing systems readily available in the industry. Programmed instructions for the parameterized packaging system are executable on processor 402. Processor 402 stores and/or retrieves the programmed instructions and/or data from memory devices that include, but are not limited to, Random Access Memory (RAM) 410 and Read Only Memory (ROM) 408 by way of memory bus 452. Another accessible memory device includes non-volatile memory device 412 by way of local bus 450. User input to computer system 400 is entered by way of keyboard 404 and/or pointing device 406. Human readable output from computer system 400 is viewed on display 414 or in printed "report" form on local printer 415. Alternatively, computer system 400 is accessible for user input and/or generating human readable displays in printed and/or display screen output form by way of Local Area Network (LAN) 416 in a manner well known in distributed computing and computer network art.

Figure 5:
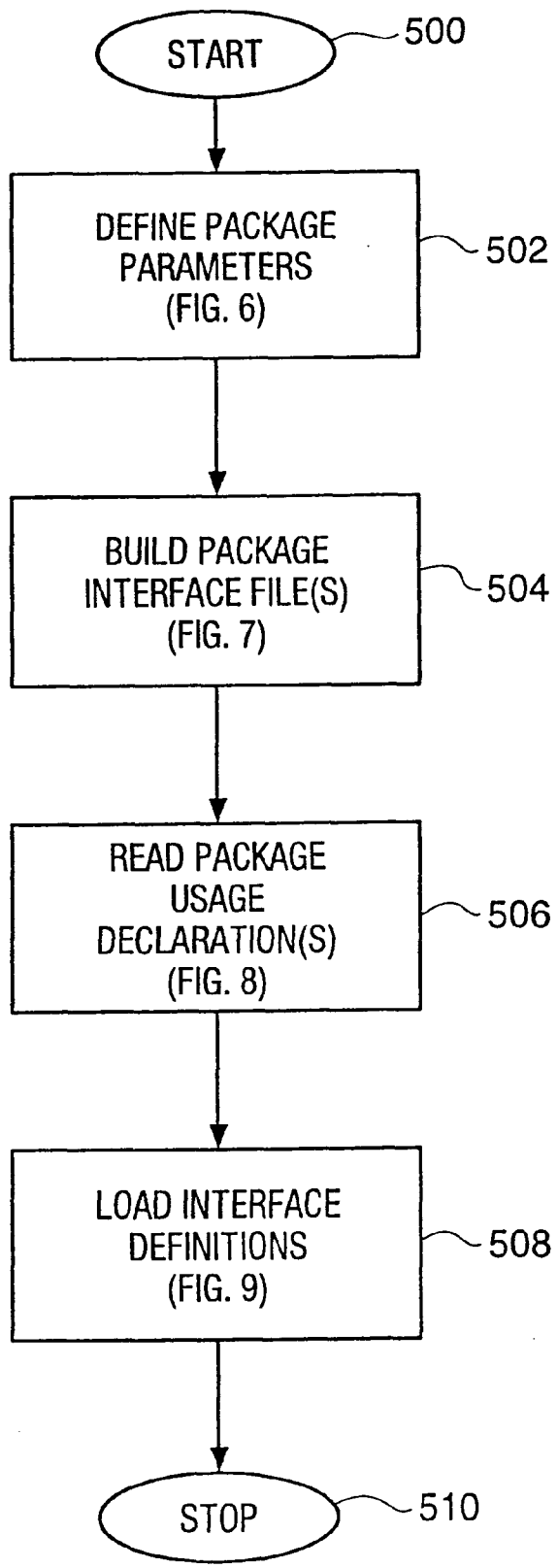
FIG. 5 is a flow chart illustrating the general operation of the methods of the present invention.

Operational Overview—FIG. 5

An operational overview of the parameterized packaging system of the present invention is provided with respect to FIG. 5. Processing steps 502–504 relate to the creation of parameterized packages, effectively the user's view of parameterized packages, and processing steps 506–508 relate to the use of parameterized packages, effectively the client's view of parameterized packages. The operation of each of steps 502–508 will be described below in more detail with respect to FIGS. 6–10 as indicated by the figure references in parentheses within each of the blocks of FIG. 5.

As used herein, the term "package" refers to a code module which provides a certain set of functionality or a certain facility. The interface for a package is the definition of how the package receives information from and provides information to other packages. A "parameterized package" is a set or a family of packages each having essentially the same underlying functionality and each having a set of interfaces which represent different ways to access the package's functionality. A "user" is a developer of parameterized packages and a "client" is a package or person that utilizes the functionality of a parameterized package. An "application" is anything that is not a development tool and typically is comprised of "client packages" that utilize the functionality of parameterized packages.

The operation of the methods of the present invention begins with element 500. In processing step 502, the interface parameters for a given package are determined and defined by the user. The number and type of parameters for a package must be determined by the user as appropriate for each package. Also, since each package has parameters which will define its interface, the user must select the default parameters for each package. A parameter's definition includes the parameter name, the possible variations of the parameter and the parameter default value. The definition of each parameter is read by the system in step 502.

In processing step 504, the interface declarations are read and package/interface files are built. For each combination of parameters defined for a given package, the system of the present invention allows the user to define a fixed set of interface elements. This fixed set of interface elements is determined by the interface declarations. There are as many interface declarations for a given package as there are different parameter combinations for the package. Each interface declaration is read and in response to each interface declaration a separate "package/interface file" is created. Each package/interface file consists essentially of a symbol table that defines the functionality of the package and the package interface. For a given package having multiple package/interface files, each of the package/interface files provides essentially the same functionality but with a different interface.

In processing step 506 the package usage declarations are read. As the compiler parses the client's code, package usage declarations are encountered. In C/C++, an application's dependencies on other code modules is expressed by using the preprocessor through the inclusion of the referenced module's header file. In the system of the present invention, an application expresses its dependencies on other code modules by specifying which code is to be used. It is the package usage declarations, read at compile time by the operation of step 506, that specify which code is to be used. Packages themselves are created by a compiler. However, the client of a package may have an implementation built upon an interpreted version of the language instead of a compiled version.

In processing step 508 the system retrieves the appropriate package/interface files in response to the package usage declarations read in step 506. The contents of the retrieved package/interface files are then loaded into the basic symbol table for further compilation. The symbols from a package/interface file may alternatively be loaded in a namespace for the particular package. The methods of the present invention are completed with step 510.

The application's symbol table has now been loaded with the symbols for the packages and desired package interfaces requested by the client. Further compilation of the client's application continues according to known methods.

Figure 6:
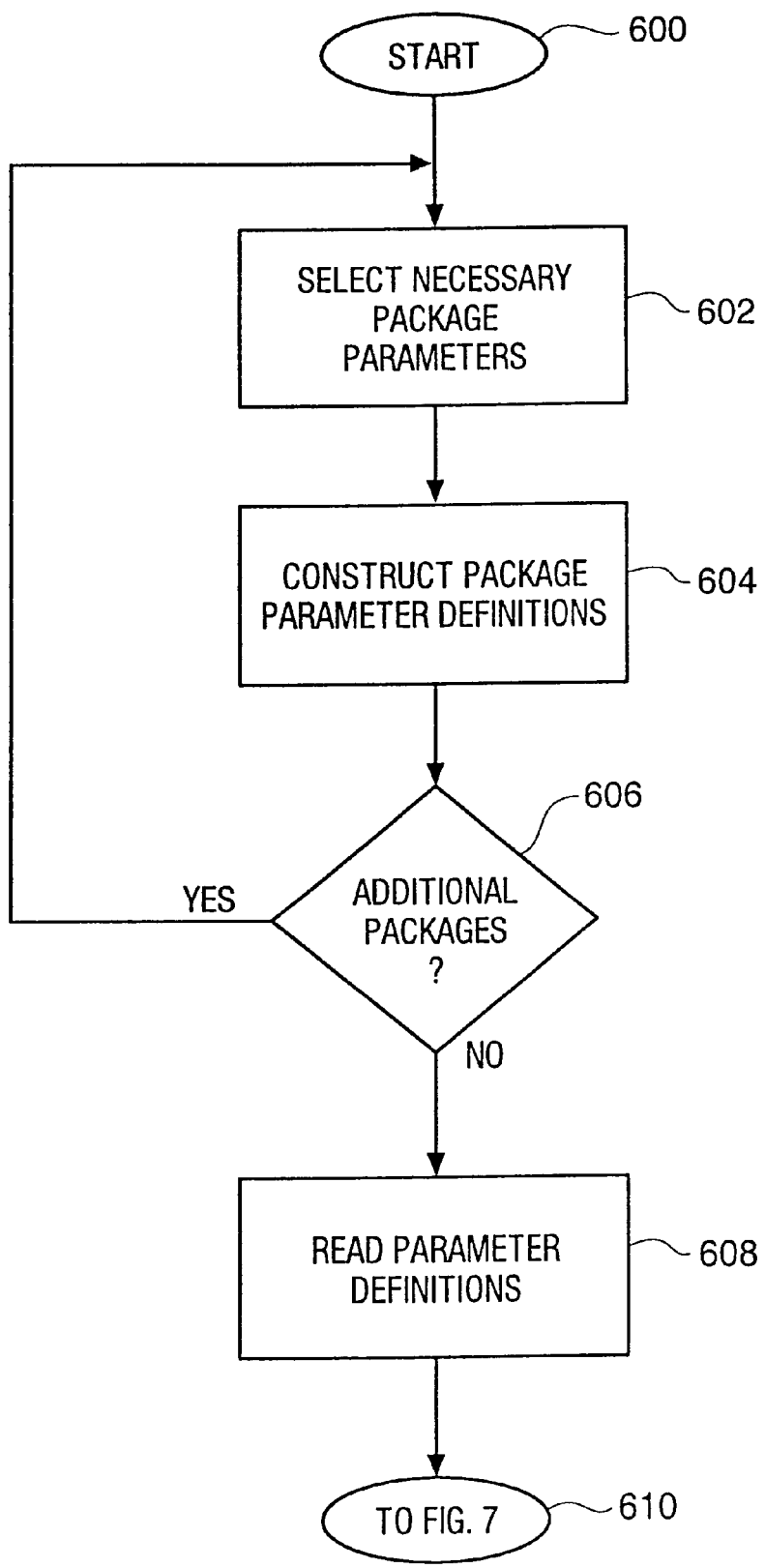
FIGS. 6–11 are flow charts illustrating further detail of the general methods illustrated in FIG. 5.

Definition of Package Parameters—FIG. 6

The flowchart of FIG. 6 represents in greater detail the operation of processing step 502 of FIG. 5. In processing step 602 the user selects the parameters that are necessary and appropriate for a given package. A user may determine that single a parameter is sufficient or may determine that multiple parameters are necessary. The extent to which a client of a package will want the option of different "flavors" of a particular interface element will determine the number of necessary parameters. As an example, consider a package that implements the functionality of the Windows™ operating system. If the user wants to provide versions of the Windows package interface for both the ANSI character set and the Unicode character set to the client of the package then a parameter is necessary to allow the client to select between the ANSI and Unicode versions of the Windows package. For each selected parameter the user must also define the possible variations of the parameter as well as the default value to be used in the event a client of the package does not specify parameters.

In processing step 604 the package parameter definitions are constructed in the syntax of the appropriate code. This definition must include the name of the parameter and the possible variations of the parameter. It can also include the parameter default value. Psuedocode for definition of the exemplary parameter discussed with respect to processing step 602 is as follows:

```
// define legal parameter types
DEFINE PARAMETER(UNICODE_FLAG, "Unicode", "NonUnicode",
Default= "Unicode")
```

"UNICODE_FLAG" is the parameter name used to select from between the "Unicode" and "NonUnicode" versions of the package interface. The Unicode version of the interface is defined as the default for parameter UNICODE_FLAG. A similar format is used to define all parameters to be used by a given package.

In processing step 606 it is determined whether there are additional packages for which parameter definition must occur. Steps 602–604 are repeated for each package requiring parameter definitions.

When all the parameters of all the packages have been defined, the system reads the parameter definitions, in processing step 608. The system then recognizes the parameter names and values when they are encountered during further compilation. The processing of steps 600–408, representing step 502 of FIG. 5, ends with step 610.

Figure 7:
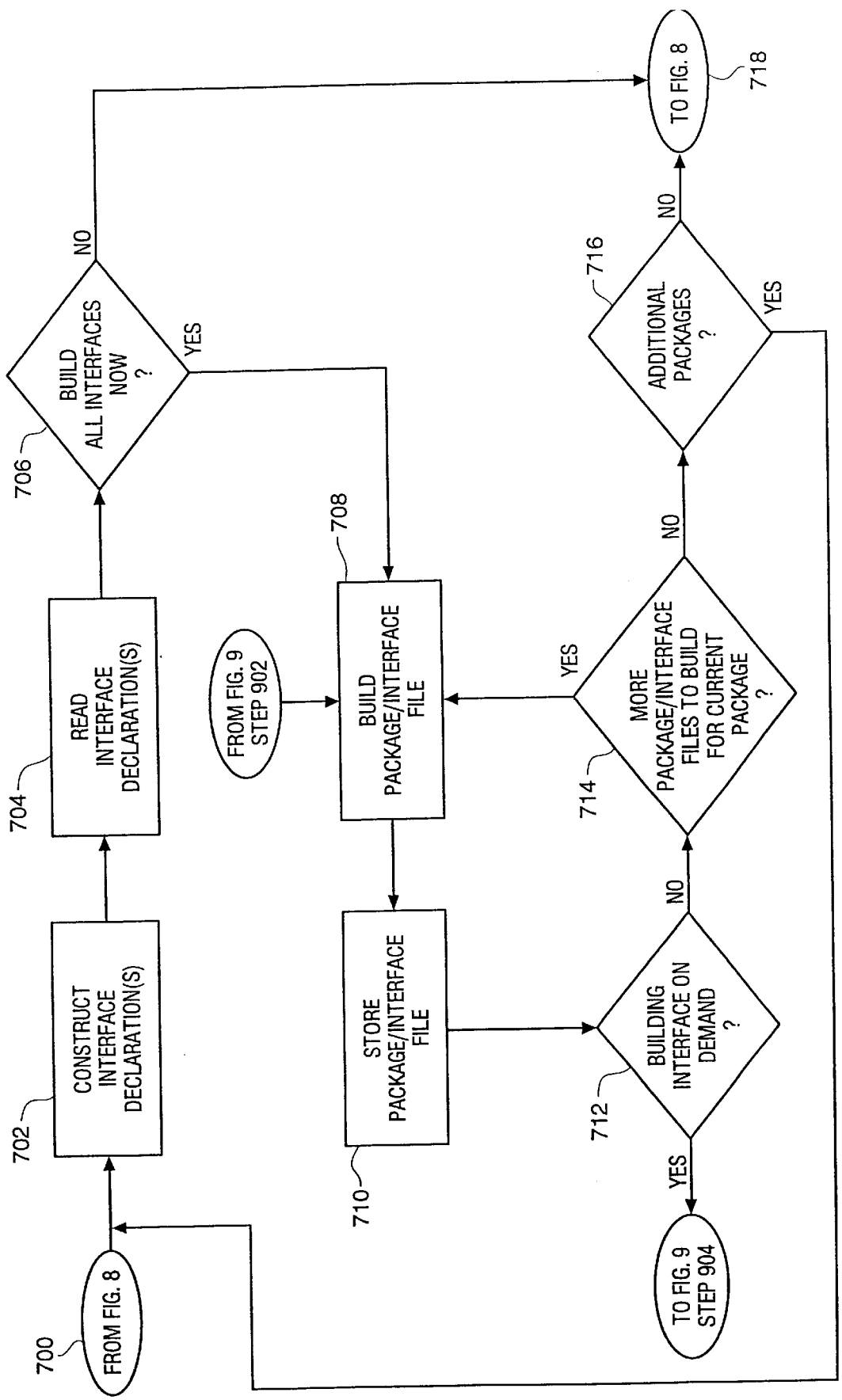

Building Package/Interface Files—FIG. 7

The flowchart of FIG. 7 represents in greater detail the operation of processing step 504 of FIG. 5. Processing begins with step 700 and in processing step 702 the interface declarations are constructed. A package having multiple possible interfaces will have an interface declaration for each possible interface. The interface declaration defines every function available to a client of the package. The following psuedocode repeats the exemplary parameter definition from above and then demonstrates related exemplary interface declarations.

```
// define legal parameter types
DEFINE PARAMETER(UNICODE_FLAG, "Unicode", "NonUnicode",
Default= "Unicode")
//declarations for Unicode interfaces
BEGIN_INTERFACE(UNICODE_FLAG= "Unicode")
UnicodeFunction(void);
END_INTERFACE
BEGIN_INTERFACE(UNICODE_FLAG= "NonUnicode")
NonUnicodeFunction(void)
END_INTERFACE
```

Each interface declaration, in the syntax of the above psuedocode, begins with "BEGIN_INTERFACE" and ends with "END_INTERFACE". Those skilled in the art recognize that in practice their would be many more function definitions in the body of the interface declaration. Only one function definition is shown in the above example for purposes of clarity. There is an interface declaration provided for each possible interface as defined by the parameters and the possible variations of the parameters.

If two or more parameters are defined for a given package and the two parameters do not interact then the interface declarations for the package will have the format of the above interface declaration example. If however, the multiple parameters do interact then the interface declaration format is slightly modified. As an example, consider a package named "Example" having two parameters, "A" and "B" that do not interact with one another. Parameter A can have the values "Aon" and "Aoff". Parameter B can have the values "Bon" and "Boff". Since there is no interaction between the parameters each interface declaration is an independent block without any dependencies on the value of other parameters.

A more powerful embodiment of the present invention allows for interaction between the parameters of a given package. In the preceding example of package "Example" having parameters "A and "B", if there is interaction between the parameters then there are four different interface declarations necessary to cover the possible combinations of variations of parameters A and B. Constructing such interface declaration families for packages with two parameters each having only two variations is a simple task. This task can become unwieldy, however, for a larger number of parameters and parameters having a larger number of variations. The task is simplified, according to the methods of the present invention, by allowing the user to use preprocessing within the interface declaration itself but disallowing these internal preprocessing macros to be available to package clients. The ensures that the interfaces for a package remain fixed and predictable but the user still gains the flexibility needed for C/C++ development where code must be preprocessed before it is usable. The use of preprocessing within the interface declarations as well as the exporting of preprocessor macros from packages is described more fully with respect to FIG. 10.

The interface declarations defined by the operation of step 702 are read into the system by the operation of processing step 704. With the definition of the parameters and the interface declarations complete, processing proceeds to decision block 706 to begin the process of constructing the package/interface files.

Decision block 706 determines if all of the possible package/interface files, each providing a different interface, are to be constructed at once or if only the requested package/interface file is to be constructed. A first approach is to build all of the different interface possibilities at once. This is done, as described below, by iterating over all the interface declarations and creating a specific package/interface file for each combination of parameter values. A second approach, which may be appropriate when there are a large number of possible interfaces, is to only build interfaces on demand. In this approach the package/interface file is only built when its use has been requested by a client of the package. As noted above, one must have access to the package sources in order to build the interfaces "on demand". Thus, it is likely to be the developer of an application who uses the "on demand" approach. If all the interfaces are to be built at once then processing proceeds with step 708. If the interfaces are to be built "on demand" then processing proceeds to step 718 and the processing of FIG. 8, described below.

Steps 708–714 operate to build all the possible package/interface files for a given package. In processing step 708, the first package/interface file for the currently selected package is built. The interface declaration is preprocessed and as each line of the interface declaration is parsed, the appropriate symbols are added to the package/interface file for that package/interface combination. Each line of an interface declaration might be a simple symbol declaration but it can also be inlined code. An example of inlined code would be the definition of a function body in addition to a declaration of the function. The function body is added to the package/interface file in its raw, intermediate language representation. When preprocessing is complete for an interface declaration, processing continues to step 710 where the completed package/interface file is stored. After storing the just-constructed package/interface file, processing continues to decision block 712.

Figure 9:
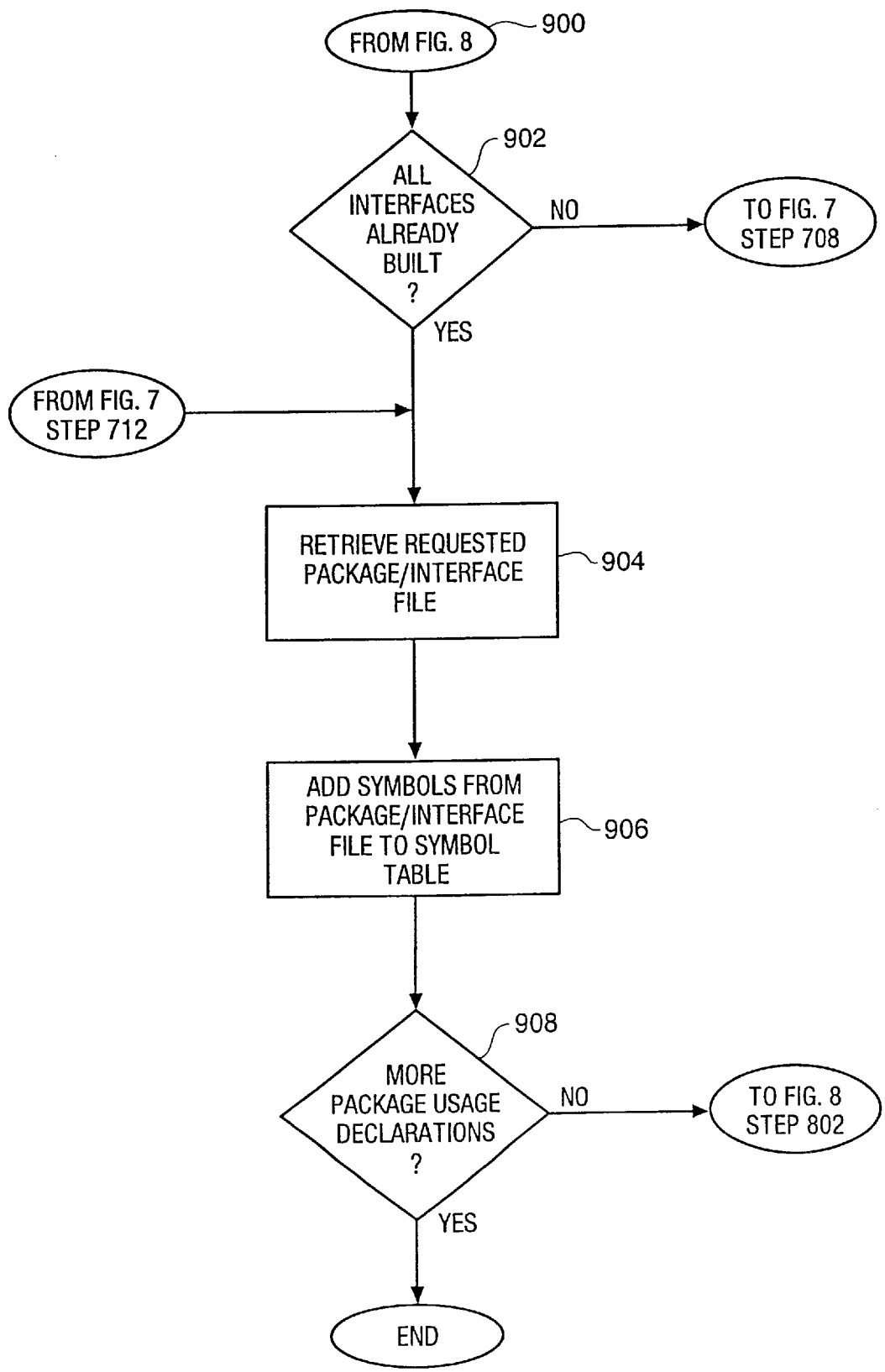

If the most recent package/interface file built and stored by the operation of steps 708–710 was built on demand, as described more fully with respect to FIG. 9, then processing continues from decision block 712 to step 904 of FIG. 9. The processing of steps 708–710 iterates, through the operation of decision block 714, over all the possible interface declarations to produce and store all of the necessary package/interface files for a given package. Once all of the package/interface files for a given package have been produced and stored, processing continues to decision block 716.

Decision block 716 determines if there are additional packages for which interface declarations require preprocessing. If there are additional packages, processing returns to step 702. The processing of steps 702–716 iterates over each package for which multiple interfaces are defined. Processing of steps 702–716, corresponding to processing step 504 of FIG. 5, concludes with step 718 from where processing continues to the steps of FIG. 8.

Figure 8:
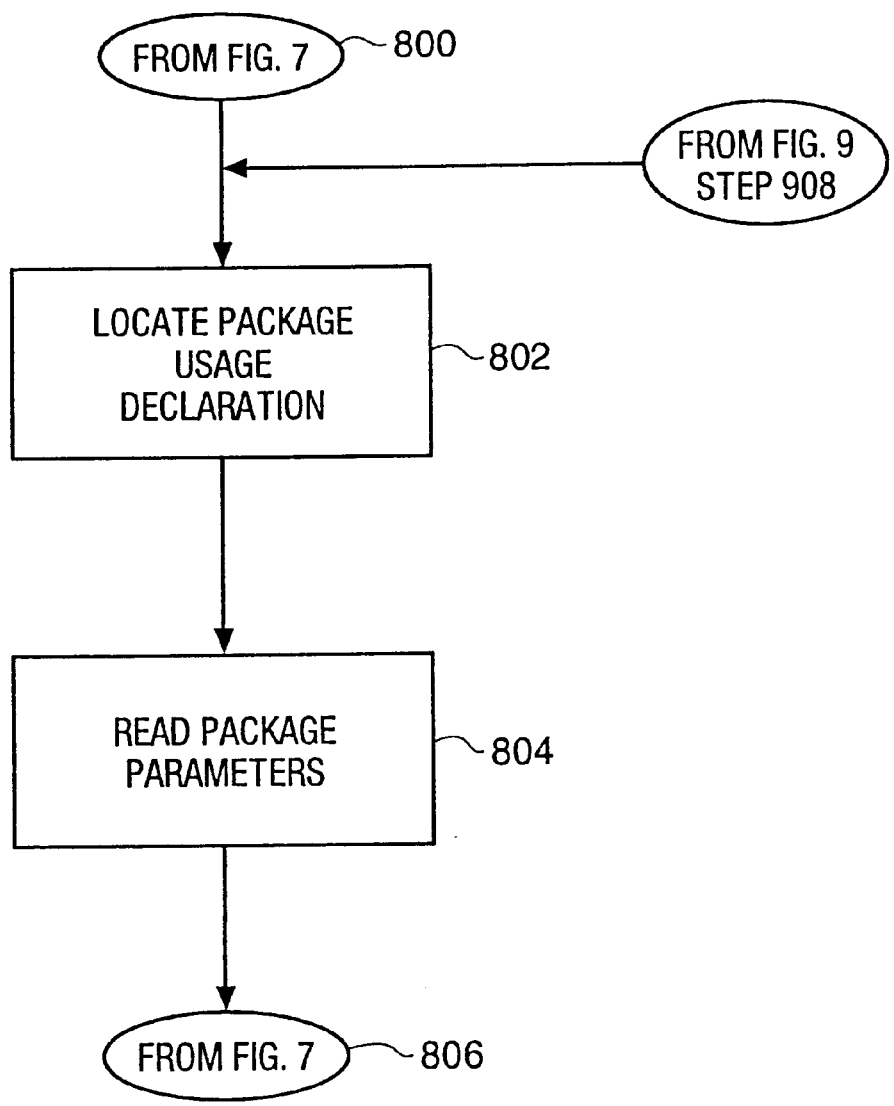

Reading Package Usage Declarations—FIG. 8

Processing steps 600–610 of FIG. 6, corresponding to step 502 of FIG. 5 and processing steps 700–718, corresponding to step 504 of FIG. 5 describe that portion of the methods of the present invention corresponding to actions taken by a user or in a development tool. Beginning with processing steps 800–806, which correspond to step 506 of FIG. 5, the compilation of a client's application utilizing the parameterized packaging system of the present invention is described.

Processing begins with step 800 and in step 802 the package usage declarations are located. The descriptions of FIGS. 6–7 used an example of a Windows package having a parameter for the selection of Unicode and nonUnicode versions of the package interface. Using that same example, psuedocode for a related package usage declaration is as follows:

---
//package usage declaration
USES Windows(NonUnicode)
---

The above package usage declaration from a client's application selects the Windows package having a non-Unicode version of the interface. Rather than using the "#include" functionality of C++, for example, to utilize the preprocessor by including the Windows header file, the client selects which facilities or packages having certain interfaces that are needed by the client's application. When the compiler parses to the point in the code containing the package usage declarations, processing proceeds to step 804.

In processing step 804 the package parameters are read from the package usage declaration by the compiler. In the above example, the package name is "Windows" and the parameter named "UNICODE_FLAG" has been specified with the parameter version "NonUnicode". The package name and package parameter values are read by the compiler by the operation of step 804. An example in psuedocode of how the system of the present invention processes the usage declarations is provided as follows:

---
// variable name definitions
PackageName PN; // the name of the package
PackageParameterList PL; // used to determine the parameters for a
// package
// parse the package usage declaration
GetPackageName(PN); // parses the "USES" line for name of
package
GetPackageParameters(PL); // get the list of package parameters, if //
any
---

The system parses each "USES" line in the clients package declarations portion of the module to get the package name and the parameters for a given package. The system of the present invention is now ready for the loading of the appropriate interface symbols as described with respect to FIG. 9. Processing of steps 800–808 concludes with element 810 from which processing continues to the steps of FIG. 9.

Loading Interface Definitions—FIG. 9

The flowchart of FIG. 9 represents in greater detail the operation of processing step 508 of FIG. 5. Steps 900–908 operate to retrieve the requested packagerinterface files and load the symbols from those objects into the compilers symbol table.

Processing begins with element 900 and decision block 902 operates to determine whether all the package/interface files have already been created and stored or whether the package/interface file for the requested package/interface combination must now be built. If all the package/interface files have already been built then processing proceeds to step 904. If the requested package/interface file must be built then processing continues to step 708 of FIG. 7. Steps 708–712 operate as described above to build and store the requested package/interface file and then return processing to step 904 of FIG. 9.

Step 904 operates to retrieve the package/interface file identified by the processing described with respect to FIG. 8. Using the package name and parameter list for the package, the appropriate package/interface file is retrieved. Processing next proceeds to step 906.

Step 906 operates to load the symbols from the selected package/interface file to the global symbol table. The symbols are thereafter available for further compilation. When using programming languages that allow it, such as C++, one may load the symbols from each selected package/interface file to a partitioned namespace for the particular package. The following psuedocode continues the exemplary psuedocode described with respect to FIG. 8 and demonstrates the retrieval of the selected package according to step 904 and the loading of symbols from the package according to step 906.

---
// define additional variable
SymbolList S; // the package/interface file in which is stored the
// symbols exposed by the package
GetPackageSymbols(PN, PL, S); // Get the package/interface file
// containing the symbols for the requested interface.
If (use_global_namespace) // If a global namespace is used.
AddToSymbolTable(S); // Load the symbols from the parameterized
//package object to the global table of symbols for further compilation.
---

-continued

```
else // If there are namespace levels as in C++.
AddToSymbolTable(PN,S); // Add the symbols to the namespace for this
// particular package.
```

The symbols for the selected package/interface combination are thereby retrieved from the package/interface file and loaded into the symbol table for further compiling. As described more fully with respect to FIG. 10, preprocessor macros may also be made available by loading them from a package/interface file to the global symbol table. The intermediate language representations of function bodies are loaded to the symbol table in the same fashion. The methods of the present invention thereby allow a client of a package to select from among a family of available interfaces for the package. The user of the package is able to provide the same functionality in multiple versions to clients of a package. Processing proceeds from step 906 to decision block 908.

Decision block 908 determines if there are additional package usage declarations. If there are additional package usage declarations then processing continues to step 802 of FIG. 8. The processing of steps 802–806 of FIG. 8 and steps 900–908 iterates over every package usage declaration in the clients code. Processing of steps 900–908 concludes with element 910.

Figure 10:
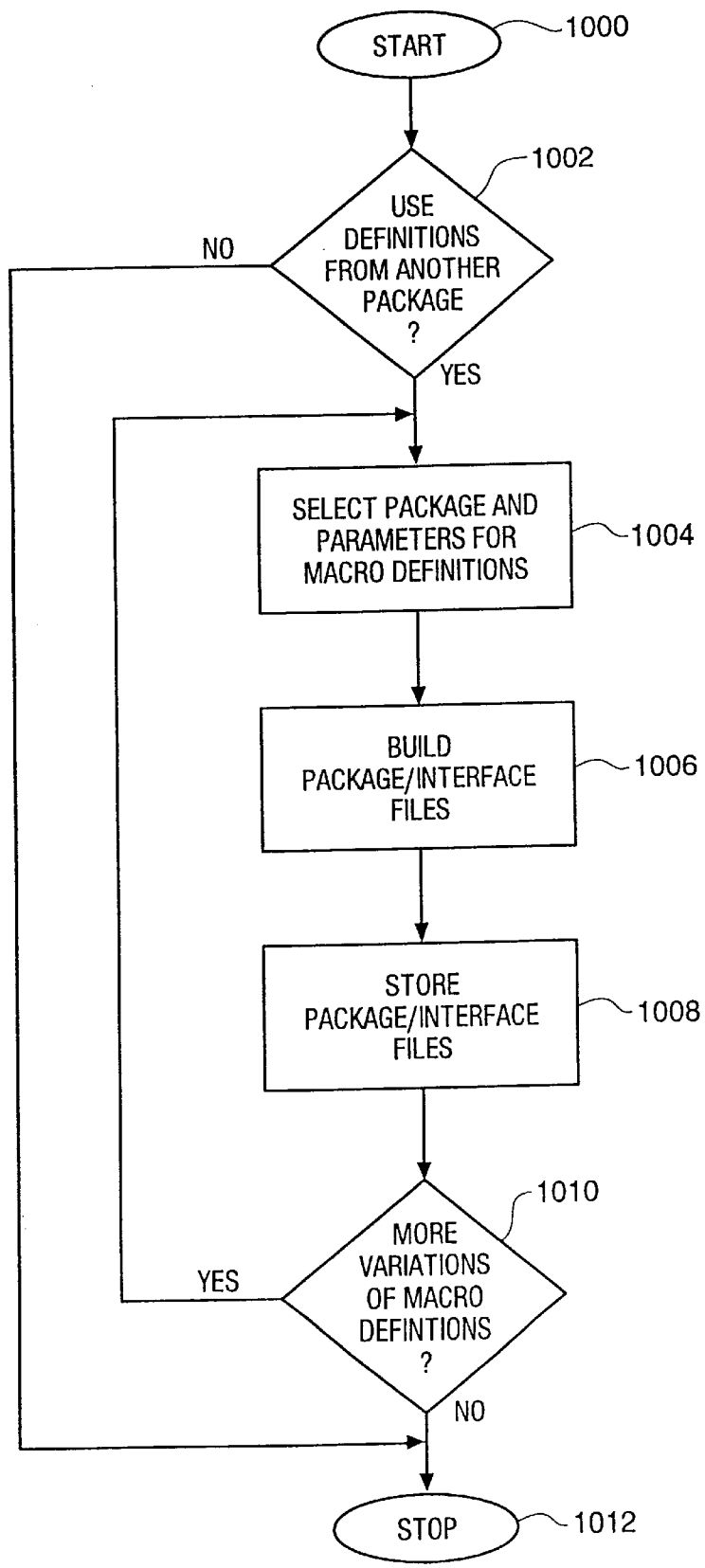

Use of Preprocessor Macros—FIG. 10

As noted above, preprocessing is available for use in the interface declarations of the present invention. This allows for significant simplification of interface declarations particularly when there are multiple, interacting parameters for a given package. An example of this approach is provided in the psuedocode below. Two parameters are defined and then the interface declarations are constructed using preprocessor definitions from another package to simplify the construction of the interface declaration family.

```
// define legal parameter types
DEFINE_PARAMETER(UNICODE_FLAG, "Unicode", "NonUnicode",
Default= "Unicode"
DEFINE_PARAMETER(DEBUG_FLAG, "Debug", "NonDebug",
Default= "NonDebug"
// use definitions from another package
// need a preprocessor definition for TCHAR, so we get it from the
//Windows package
USES Windows(UNICODE_FLAG); // whatever our parameter is, it gets
passed to the Windows package.
// declarations for debug interfaces
BEGIN_INTERFACE(DEBUG_FLAG= "Debug")
int Assertion(int, TCHAR * szMessage);// using TCHAR macro
END_INTERFACE
BEGIN_INTERFACE(DEBUG_FLAG= "NonDebug")
// no new declarations for the nondebug case
END_INTERFACE
```

The above code iterates over each variation of UNICODE_FLAG thereby imbedding the interaction between the parameters in the interface declarations themselves.

This simplifies the construction of the interface declarations by providing powerful preprocessing capability familiar to users of C/C++.

FIG. 10 is a flow chart illustrating the use of preprocessor macros in building a family of packagerinterface files for a package where there are multiple interacting parameters as in the above example of the UNICODE and DEBUG parameters for the Windows package. The processing of steps 1000–1012 is analogous to the processing described with respect to FIG. 7. In the example of FIG. 7, processing iterates over each possible package/interface file variation for a given package. In the example of FIG. 10, preprocessing macros are used, as described below, to simplify the task of building the complete family of package/interface files where the package parameters interact. FIG. 10 does not illustrate the processing of multiple packages or the necessary decision making associated with building all package/interface files at once or building single package/interface files "on demand", as described with respect to FIG. 7. Those skilled in the art recognize that these detailed features are equally applicable when one is using macros to simplify the package/interface building process, as in the example of FIG. 10.

In general, for packages having multiple interacting parameters, the package is first selected through a package usage declaration specifying less than all of the package parameters. Each succeeding interface declaration next varies the value(s) of the other parameters. The interface declarations are processed to build the various packager-interface files. This process is repeated for each possible set of parameter values specified in the package usage declaration. The preceding psuedocode example is an example of the usage of preprocessor macros to build package/interface files and the process is outlined in FIG. 10, described below.

Processing of steps 100–1012 begins with element 1000. Element 1000 is executed when a decision is made to initiate the process of building the family of package/interface files for a package. Processing continues with decision block 1002. Decision block 1002 operates to determine if, for the package presently being processed, macro definitions from another package are to be used to simplify the task of building the family of package/interface files. If macro definitions from another package are not to be used, as in the example of FIG. 7, then processing continues to element 1012 where processing concludes. If macro definitions from another package are to be used then processing continues to set 1004.

Step 1004 operates to select the package from which macro definitions are to be used. In the preceding psuedocode example, the package usage declaration is an example of the operation of step 1004. In the preceding psuedocode example, the usage declaration, "USES Windows (UNICODE_FLAG) selects the version of the Windows package from which the preprocessor macros will be obtained. Step 1004 will iterate for each possible value of the parameters specified in the usage declaration. In the example of the preceding psuedocode, UNICODE_FLAG has two possible variants, Unicode and NonUnicode, thus step 1004 will iterate, through the operation of decision block 1010, twice. Processing continues from step 1004 to step 1006.

Step 1006 operates to build a package/interface file for each variation of the other parameters for the package. In the preceding psuedocode example, for each of the two Windows package usage declarations, a package/interface file is built for each variation of the Debug parameter. This results in a total of four package/interface files being constructed in the preceding psuedocode example. Multiple nested package usage declarations can be used, for example, when building the family of package/interface files for a package having three or more interacting parameters. After the completion of the package/interface files for one value of one of the parameters, processing continues to step 1008 where the package/interface files are stored. Processing next proceeds to decision block 1010.

Decision block 1010 operates to return processing to step 1004 if there are further variations to be processed of the parameter that was held constant during the building of the last set of packagerinterface files. In the preceding psuedocode example, the two interface declarations are processed using macro definitions from the Unicode version of the Windows package. Processing next returns from decision block 1010 to step 1004 to select the NonUnicode version of the Windows package. The two interface declaration are again processed to build and store (steps 1006–1008) two more package/interface files using the nonUnicode version of the Windows package. Processing then concludes with element 1012.

The example illustrated by FIG. 10 illustrates the use of preprocessor macros to construct an interface. An additional feature of the present invention is the ability to export preprocessor macros to other packages. It is also helpful if one package can use a preprocessor macro from a second package and export the macro to a third package. The following psuedocode demonstrates the retrieval of a macro from a package and then making that macro available for export to another package.

```
// define legal parameter types
DEFINE_PARAMETER(DEBUG_FLAG, "Debug", "NonDebug",
Default= "NonDebug")
// use definitions from another package
// need a preprocessor definition for TCHAR, so we get it from the
//Windows package
USES Windows(NonUnicode); // get definition for TCHAR macro
// declarations for debug interfaces
BEGIN_INTERFACE(DEBUG_FLAG= "Debug")
int Assertion(int, TCHAR * szMessage); // for assertion messages
DEFINE_MACRO("DEBUG", "1")
EXPOSE_MACRO("TCHAR") // takes the macro from Windows and
// exposes it to other packages
END_INTERFACE
```

This example demonstrates the interface declaration for the Debug/NonUnicode version of the Windows interface. The UNICODE_FLAG parameter having the value "NonUnicode" is passed to the Windows package. The NonUnicode definition of the TCHAR macro is then used in the interface definition. The TCHAR macro is then made available to other packages by the operation of the DEFINE_MACRO and EXPOSE_MACRO instructions.

Interactive Querying of Package Interfaces

A further advantage of the methods of the present invention is that a user or a client has knowledge of the full set of interface elements or symbols available to them for a certain version of a package interface. With languages like C/C++ there is no well-defined way of knowing what symbols or interface elements are available to them for the particular version of the facility that they have chosen. There are products available to assist users with this problem but they all depend on static tables of what symbols and functions are available for an interface as of a certain date. If an element is added or the user constructs his or her own interfaces, these new elements will have to be added to the static tables. Additionally, there is no way to determine which preprocessor macros are available at the point of the client code until a full compile is nearly complete.

Using the parameterized packaging system of the present invention both of these problems are solved. A package's interfaces and the respective elements of those interfaces are known before any of the client code for that package is built. Therefore the user can specify which interface he or she wishes to work with and a complete list of all the symbols available to the user is presented. The only preceding step which must have occurred is the construction of the requested package interface. This information is available for user-created interfaces just as it available for vendor-supplied interfaces. In addition to the interface elements and functions, all available preprocessor macros are also visible to the user for a given package/interface.

Figure 11:
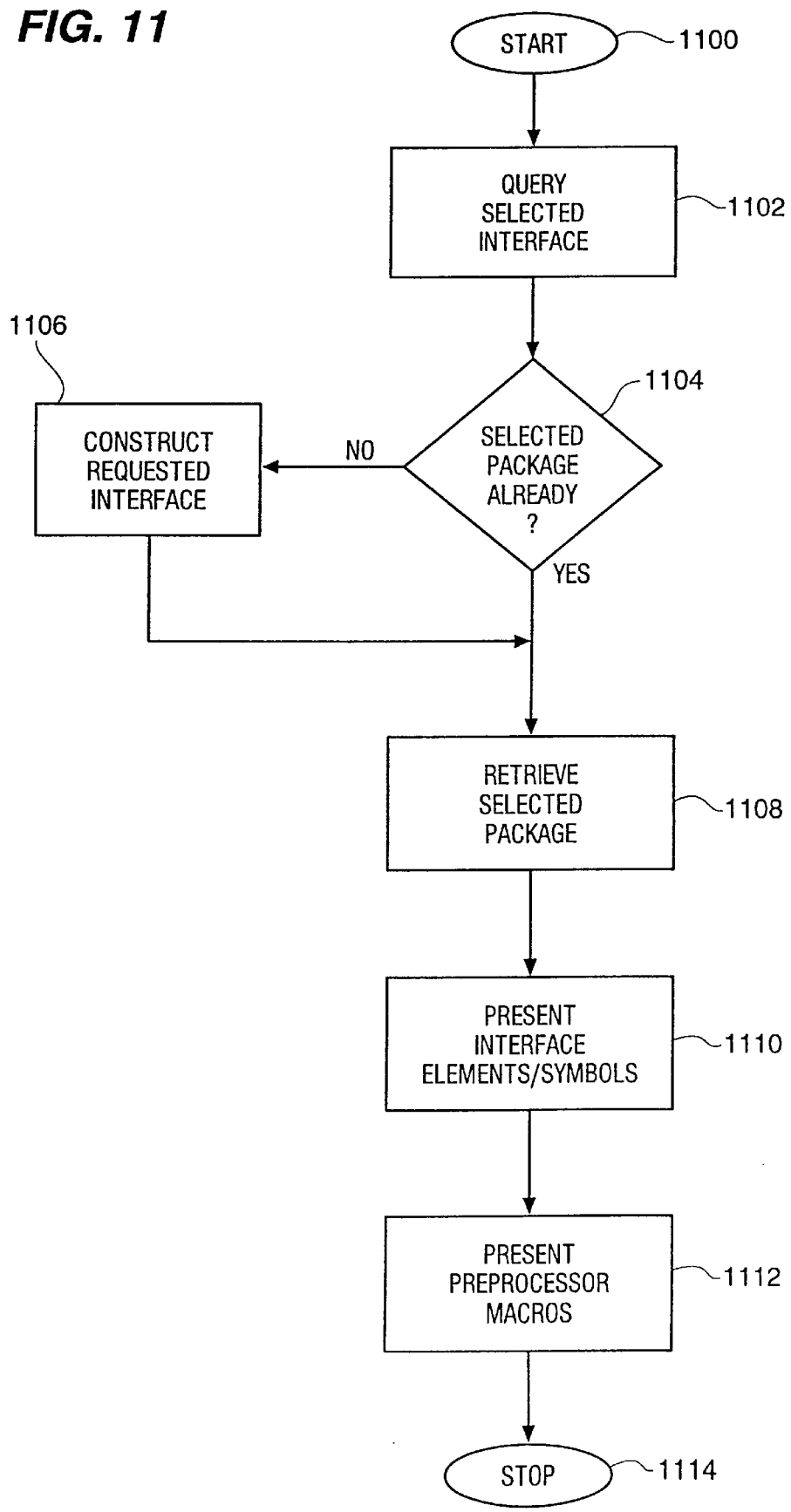

FIG. 11 represents the steps used to respond to an interface query. Processing starts with element 1100 and in step 1102 an interface query is received. An exemplary interface query from a user is of the form:

```
INTERFACE_QUERY(Windows, Unicode, Debug)
```

The query parameters include the package name, Windows, and the package parameters, Unicode and Debug in the above example. This query requests the interface elements for the package/interface file containing the symbols and preprocessor macros of the Windows package having the Unicode and debug C runtime library interface. Processing next proceeds to decision block 1104.

Decision block 1104 determines if the package/interface file of the queried interface already exists. If the package already exists then processing proceeds to step 1108. If the package does not exist then processing proceeds to step 1106 where the requested package/interface file is constructed. The necessary steps for accomplishing this task are described above with respect to steps 708–710 of FIG. 7.

In step 1108 the selected package/interface file is retrieved. In step 1110 the symbols contained in the package/interface file are presented to the user and in step 1112 the preprocessor macros available in the selected package/interface file are presented to the user. Processing of steps 1100–1112 concludes with element 1114.

SUMMARY

The parameterized packaging system of the present invention combines the powerful flexibility of preprocessing, familiar to users of C/C++, and the fixed and predictable interfaces of the Ada-like programming languages. Users can query existing package/interface files to get a complete listing of all symbols and preprocessor macros available in the package.

It is to be expressly understood that the claimed invention is not to be limited to the description of the preferred embodiment but encompasses other modifications and alterations within the scope and spirit of the inventive concept.

What is claimed:

1. A method for selecting a package having a pre-defined set of interface elements in an application development system for a preprocessed computer programming language wherein said package is a programming module, said method comprising the steps of:

defining a group of package/interface files for said package, said package/interface files each having a different said pre-defined set of interface elements;

reading n interface parameters from a parameterized package usage declaration where n is an arbitrary number;

selecting a one of said package/interface files in response to reading said n interface parameters;

retrieving said one package/interface file; and loading a set of package/interface symbols defining said pre-defined set of interface elements from said one package/interface file to a symbol table wherein said symbol table contains a global list of symbols known in said preprocessing computing environment.

2. The method of claim 1 wherein said step of defining said group of package/interface files for said package includes:

defining said n interface parameters, each of said n interface parameters having variations and a default value; and building said package/interface files each having a unique said set of pre-defined interface elements.

3. The method of claim 2 wherein said step of defining said n interface parameters includes:

determining said group of said package/interface files necessary for said package wherein each one of said group of package/interface files represents a different version of said pre-defined set of interface elements to be made available to a user of said package; and selecting said n interface parameters so that combinations of said n interface parameters uniquely identify ones of said group of said package/interface files.

4. The method of claim 2 wherein said step of building said package/interface files includes:

constructing an interface declaration for each said package/interface file of said group of package/interface files, said interface declaration containing a name of said package, a list of said n parameters unique to said packagerinterface file and definitions of the interface elements for said package/interface file.

5. The method of claim 4 wherein said step of building said package/interface files further includes:

parsing a one of said interface declarations to produce symbols; and constructing, responsive to said preprocessing step, a one of said group of package/interface files.

6. The method of claim 5 wherein said parsing step includes:

preprocessing a macro contained within said interface declaration to produce symbols.

7. The method of claim 6 wherein said preprocessing step includes:

reading an interface package usage declaration within said interface declaration;

obtaining said macro from a second package responsive to said interface package usage declaration; and preprocessing said macro to produce symbols.

8. The method of claim 5 wherein said constructing step includes:

parsing each line of said one interface declaration to produce symbols;

appending said symbols, responsive to said parsing step, to a symbol list containing said symbols for said one interface declaration.

9. The method of claim 8 wherein said constructing step further includes:

storing said symbol list associated with said one interface declaration as one of said package/interface files of said group of package/interface files.

10. The method of claim 1 wherein said step of selecting a one of said package/interface files includes:

building, responsive to said step of reading n interface parameters from a package usage declaration, a selected package/interface file having a unique said set of pre-defined interface elements.

11. The method of claim 10 wherein said step of defining said package/interface files includes:

determining said group of said package/interface files necessary for said package wherein each one of said group of package/interface files represents a different version of said pre-defined set of interface elements to be made available to a user of said package; and selecting n interface parameters so that combinations of said n interface parameters uniquely identify ones of said group of said package/interface files.

12. The method of claim 11 wherein said step of defining said package/interface files includes:

constructing an interface declaration for each said package/interface file of said group of package/interface files, said interface declaration containing a name of said package, a list of said n parameters unique to said package/interface file and definitions of the interface elements for said package/interface file.

13. The method of claim 12 wherein said step of building said selected package/interface file includes:

selecting a one of said interface declarations responsive to said step of reading n interface parameters from a parameterized package usage declaration; parsing said selected interface declaration; and constructing, responsive to said parsing step, said selected package interface file.

14. The method of claim 13 wherein said parsing step includes:

preprocessing a macro contained within said interface declaration to produce symbols.

15. The method of claim 14 wherein said preprocessing step includes:

reading an interface package usage declaration within said interface declaration;

obtaining said macro from a second package responsive to said interface package usage declaration; and preprocessing said macro to produce symbols.

16. The method of claim 13 wherein said constructing step includes:

parsing each line of said selected interface declaration to produce symbols;

appending said package symbols, responsive to said parsing step, to a package symbol list containing said symbols for said selected interface declaration.

17. The method of claim 16 wherein said constructing step further includes:

storing said package symbol list associated with said selected interface declaration as said selected package/interface file.

18. The method of claim 17 wherein said step of retrieving a one of said package/interface files includes:

retrieving said selected package/interface file.

19. The method of claim 18 wherein said loading step includes:

appending said package symbols from said selected package/interface file to said symbol table containing said global list of symbols, said global list of symbols containing said symbols known in said preprocessing computing environment.

20. The method of claim 19 wherein said loading step includes:

appending said package symbols from said selected package/interface file to a namespace associated with said symbol table wherein said symbol table and said namespace contain symbols known in said preprocessing computing environment.

21. The method of claim 20 wherein said loading step includes:

appending said package symbols from said selected package/interface file to said symbol table wherein said package symbols includes symbols and preprocessor macros.

22. A computer-readable medium having computer-executable instructions for selecting a package having a pre-defined set of interface elements in an application development system for a preprocessed computer programming language wherein said package is a programming module, said method steps comprising:

defining a group of package/interface files for said package, said package/interface files each having a different said pre-defined set of interface elements;

reading n interface parameters from a parameterized package usage declaration where n is an arbitrary number;

selecting a one of said packagerinterface files in response to reading said n interface parameters;

retrieving said one package/interface file; and loading a set of package/interface symbols defining said pre-defined set of interface elements from said one package/interface file to a symbol table wherein said symbol table contains a global list of symbols known in said preprocessing computing environment.

23. The computer-readable medium of claim 22 wherein said step of defining said group of package/interface files for said package includes:

defining said n interface parameters, each of said n interface parameters having variations and a default value; and building said package/interface files each having a unique said set of pre-defined interface elements.

24. The computer-readable medium of claim 23 wherein said step of defining said n interface parameters includes:

determining said group of said package/interface files necessary for said package wherein each one of said group of package/interface files represents a different version of said pre-defined set of interface elements to be made available to a user of said package; and selecting said n interface parameters so that combinations of said n interface parameters uniquely identify ones of said group of said package/interface files.

25. The computer-readable medium of claim 23 wherein said step of building said package/interface files includes:

constructing an interface declaration for each said package/interface file of said group of package/interface files, said interface declaration containing a name of said package, a list of said n parameters unique to said package/interface file and definitions of the interface elements for said package/interface file.

26. The computer-readable medium of claim 25 wherein said step of building said package/interface files further includes:

parsing a one of said interface declarations to produce symbols; and constructing, responsive to said preprocessing step, a one of said group of package/interface files.

27. The computer-readable medium of claim 26 wherein said parsing step includes:

preprocessing a macro contained within said interface declaration to produce symbols.

28. The computer-readable medium of claim 27 wherein said preprocessing step includes:

reading an interface package usage declaration within said interface declaration;

obtaining said macro from a second package responsive to said interface package usage declaration; and preprocessing said macro to produce symbols.

29. The computer-readable medium of claim 26 wherein said constructing step includes:

parsing each line of said one interface declaration to produce symbols;

appending said symbols, responsive to said parsing step, to a symbol list containing said symbols for said one interface declaration.

30. The computer-readable medium of claim 29 wherein said constructing step further includes:

storing said symbol list associated with said one interface declaration as one of said package/interface files of said group of package/interface files.

31. The computer-readable medium of claim 22 wherein said step of selecting a one of said package/interface files includes:

building, responsive to said step of reading n interface parameters from a package usage declaration, a selected package/interface file having a unique said set of pre-defined interface elements.

32. The computer-readable medium of claim 31 wherein said step of defining said package/interface includes:

determining said group of said package/interface files necessary for said package wherein each one of said group of package/interface files represents a different version of said pre-defined set of interface elements to be made available to a user of said package; and selecting n interface parameters so that combinations of said n interface parameters uniquely identify ones of said group of said package/interface files.

33. The computer-readable medium of claim 32 wherein said step of defining said package/interface files includes:

constructing an interface declaration for each said package/interface file of said group of package/interface files, said interface declaration containing a name of said package, a list of said n parameters unique to said packagerinterface file and definitions of the interface elements for said package/interface file.

34. The computer-readable medium of claim 33 wherein said step of building said selected package/interface file includes:

selecting a one of said interface declarations responsive to said step of reading n interface parameters from a parameterized package usage declaration; parsing said selected interface declaration; and constructing, responsive to said parsing step, said selected package interface file.

35. The computer-readable medium of claim 34 wherein said parsing step includes:

preprocessing a macro contained within said interface declaration to produce symbols.

36. The computer-readable medium of claim 35 wherein said preprocessing step includes:

reading an interface package usage declaration within said interface declaration;

obtaining said macro from a second package responsive to said interface package usage declaration; and preprocessing said macro to produce symbols.

37. The computer-readable medium of claim 34 wherein said constructing step includes:

parsing each line of said selected interface declaration to produce symbols;

appending said package symbols, responsive to said parsing step, to a package symbol list containing said symbols for said selected interface declaration.

38. The computer-readable medium of claim 37 wherein said constructing step further includes:

storing said package symbol list associated with said selected interface declaration as said selected package/interface file.

39. The computer-readable medium of claim 38 wherein said step of retrieving a one of said package/interface files includes:

retrieving said selected package/interface file.

40. The computer-readable medium of claim 39 wherein said loading step includes:

appending said package symbols from said selected package/interface file to said symbol table containing said global list of symbols, said global list of symbols containing said symbols known in said preprocessing computing environment.

41. The computer-readable medium of claim 40 wherein said loading step includes:

appending said package symbols from said selected package/interface file to a namespace associated with said symbol table wherein said symbol table and said namespace contain symbols known in said preprocessing computing environment.

42. The computer-readable medium of claim 40 wherein said loading step includes:

appending said package symbols from said selected package/interface file to said symbol table wherein said package symbols includes symbols and preprocessor macros.

* * * * *

UNITED STATES PATENT AND TRADEMARK OFFICE
CERTIFICATE OF CORRECTION

PATENT NO. : 6,101,325
DATED : August 8, 2000
INVENTOR(S) : C.A. Flaat

It is certified that error appears in the above-identified patent and that said Letters Patent is hereby corrected as shown below:

| COLUMN | LINE | |
|---|---|---|
| [56] Pg. 1, col. 1 | Refs. Cited (Other Publs., Item 1) | "The Design and Evoluton of C++," should read --*The Design and Evoluton of C++,*-- |
| [56] Pg. 1, col. 1 | Refs. Cited (Other Publs., Item 3) | "Internet Software Development Tools Arrive," should read --"Internet Software Development Tools Arrive,"-- |
| 1 | 31 | "preexisting" should read --pre-existing-- |
| 1 | 38 | "preexisting" should read --pre-existing-- |
| 2 | 58 | "are exposed" should read --is exposed-- |
| 3 | 28 | "Alternatively" should read --Alternatively,-- |
| 3 | 41 | after "available" delete "for" |
| 3 | 44 | "Prior Art" should read --prior art-- |
| 3 | 55 | after "invention;" insert --and-- |
| 3 | 56 | "detail" should read --details-- |
| 3 | 64 | "code each" should read --code, each-- |

UNITED STATES PATENT AND TRADEMARK OFFICE
CERTIFICATE OF CORRECTION

PATENT NO. : 6,101,325
DATED : August 8, 2000
INVENTOR(S) : C.A. Flaat

It is certified that error appears in the above-identified patent and that said Letters Patent is hereby corrected as shown below:

| COLUMN | LINE | |
|---|---|---|
| 4 | 12 | "has" should read --have-- |
| 4 | 16 | "115" should read --115,-- |
| 4 | 56 | "can not" should read --cannot-- |
| 4 | 63 | after "interface" insert --,-- |
| 6 | 63 | "single a" should read --a single-- |
| 7 | 4 | after "package" insert --,-- |
| 7 | 35 | after "definitions" delete "," |
| 7 | 38 | "600-408" should read --600-608-- |
| 7 | 66 | "their" should read --there-- |
| 8 | 6 | after "interact" insert --,-- |
| 8 | 9 | after "interact" insert --,-- |
| 8 | 11-12 | "and "B" that" should read --and "B," that-- |
| 8 | 15 | after "parameters" insert --,-- |

UNITED STATES PATENT AND TRADEMARK OFFICE
CERTIFICATE OF CORRECTION

PATENT NO. : 6,101,325
DATED : August 8, 2000
INVENTOR(S) : C.A. Flaat

It is certified that error appears in the above-identified patent and that said Letters Patent is hereby corrected as shown below:

| COLUMN | LINE | |
|---|---|---|
| 8 | 21 | "parameters "A and "B", if" should read --parameters "A" and "B", if-- |
| 8 | 22 | after "parameters" insert --,-- |
| 8 | 33 | "The ensures" should read --This ensures-- |
| 8 | 62 | after "at once" insert --,-- |
| 8 | 63-64 | "built "on demand" then" should read --built "on demand," then-- |
| 9 | 31 | delete "where" and insert --which point-- |
| 9 | 36 | insert --,-- after "FIG. 5" |
| 9 | 56 | "non-Unicode" should read --nonUnicode-- |
| 9 | 60 | delete "that" |
| 10 | 17 | "clients" should read --client's-- |
| 10 | 28 | "packagerinterface" should read --package/interface-- |
| 10 | 29 | "compilers" should read --compiler's-- |

UNITED STATES PATENT AND TRADEMARK OFFICE
CERTIFICATE OF CORRECTION

PATENT NO. : 6,101,325
DATED : August 8, 2000
INVENTOR(S) : C.A. Flaat

It is certified that error appears in the above-identified patent and that said Letters Patent is hereby corrected as shown below:

| COLUMN | LINE | |
|---|---|---|
| 10 | 36 | after "built" insert --,-- |
| 10 | 37 | after "built" insert --,-- |
| 11 | 22 | after "declarations" insert --,-- |
| 11 | 25 | "clients" should read --client's-- |
| 11 | 57 | do not begin new paragraph after "themselves." |
| 11 | 62 | "packagerinterface" should read --package/interface-- |
| 12 | 19 | "packager-" should read --package/-- |
| 12 | 25 | "100-1012" should read --1000-1012-- |
| 12 | 35 | "If" should read --If-- |
| 12 | 36 | after "used" insert --,-- |
| 12 | 37 | "set" should read --step-- |
| 12 | 48 | "NonUnicode," should read --NonUnicode;-- |
| 13 | 2 | "packagerinterface" should read --package/interface-- |

UNITED STATES PATENT AND TRADEMARK OFFICE
CERTIFICATE OF CORRECTION

PATENT NO. : 6,101,325
DATED : August 8, 2000
INVENTOR(S) : C.A. Flaat

It is certified that error appears in the above-identified patent and that said Letters Patent is hereby corrected as shown below:

| COLUMN | LINE | |
|---|---|---|
| 13 | 8 | "declaration" should read --declarations-- |
| 14 | 2 | after "it" insert --is-- |
| 14 | 24 | after "exists" insert --,-- |
| 14 | 25 | after "exist" insert --,-- |
| 15 (Claim 4, | 26 line 7) | "packagerinterface" should read --package/interface-- |
| 15 (Claim 8, | 46 line 4) | after "symbols;" insert --and-- |
| 16 (Claim 13, | 19-20 line 5-6) | the phrase beginning "parsing said selected..." should begin a new subparagraph |
| 16 (Claim 16, | 36 line 4) | after "symbols;" insert --and-- |
| 16 (Claim 21, | 66 line 5) | "includes" should read --include-- |
| 17 (Claim 22, | 13 line 13) | "packagerinterface" should read --package/interface-- |

UNITED STATES PATENT AND TRADEMARK OFFICE
CERTIFICATE OF CORRECTION

PATENT NO. : 6,101,325
DATED : August 8, 2000
INVENTOR(S) : C.A. Flaat

It is certified that error appears in the above-identified patent and that said Letters Patent is hereby corrected as shown below:

| COLUMN | LINE | |
|---|---|---|
| 18 (Claim 29, | 4 line 4) | after "symbols;" insert --and-- |
| 18 (Claim 33, | 37 line 7) | "packagerinterface" should read --package/interface-- |
| 18 (Claim 34, | 44-45 line 6-7) | the phrase beginning "parsing said selected..." should begin a new subparagraph |
| 18 (Claim 37, | 64 line 4) | after "symbols;" insert --and-- |
| 20 (Claim 42, | 14 line 5) | "includes" should read --include-- |

Signed and Sealed this

First Day of May, 2001

Attest:

NICHOLAS P. GODICI

*Attesting Officer*  *Acting Director of the United States Patent and Trademark Office*